(12) United States Patent
Thomson et al.

(10) Patent No.: US 8,716,887 B2
(45) Date of Patent: May 6, 2014

(54) SYSTEMS AND APPARATUS FOR MONITORING AND SELECTIVELY CONTROLLING A LOAD IN A POWER SYSTEM

(75) Inventors: Matthew Thomson, Marietta, GA (US); Nathan Bowman Littrell, Gardenerville, NV (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 12/793,167

(22) Filed: Jun. 3, 2010

(65) Prior Publication Data
US 2011/0298284 A1 Dec. 8, 2011

(51) Int. Cl.
*H02J 3/14* (2006.01)

(52) U.S. Cl.
USPC ............... 307/39; 307/11; 307/38; 307/40; 307/41; 700/11; 700/12

(58) Field of Classification Search
USPC .......... 307/11, 33, 35, 38–41; 700/11, 12, 17, 700/21; 340/10.01
See application file for complete search history.

(56) References Cited

U.S. PATENT DOCUMENTS

| | | | |
|---|---|---|---|
| 4,075,699 A * | 2/1978 | Schneider et al. | 700/291 |
| 5,811,966 A | 9/1998 | Lee | |
| 6,388,564 B1 * | 5/2002 | Piercy et al. | 340/6.1 |
| 6,552,888 B2 | 4/2003 | Weinberger | |
| 6,792,337 B2 * | 9/2004 | Blackett et al. | 700/295 |
| 6,832,135 B2 * | 12/2004 | Ying | 700/295 |
| 6,861,956 B2 * | 3/2005 | Ying | 340/12.52 |
| 6,862,498 B2 * | 3/2005 | Davis et al. | 700/295 |
| 7,002,264 B2 | 2/2006 | Logan | |
| 7,041,899 B2 | 5/2006 | Stekelenburg | |
| 7,257,466 B2 | 8/2007 | Kreiner | |
| 7,323,968 B2 | 1/2008 | Iwamura | |
| 7,400,066 B2 * | 7/2008 | Tassitino et al. | 307/46 |
| 7,635,284 B1 | 12/2009 | Nemir et al. | |
| 7,641,126 B2 | 1/2010 | Schultz et al. | |
| 2005/0239491 A1 * | 10/2005 | Feder et al. | 455/522 |
| 2006/0049694 A1 * | 3/2006 | Kates | 307/132 E |
| 2007/0198748 A1 | 8/2007 | Ametsitsi et al. | |
| 2007/0271006 A1 * | 11/2007 | Golden et al. | 700/295 |
| 2008/0238404 A1 * | 10/2008 | Ferguson | 324/76.11 |
| 2009/0055032 A1 * | 2/2009 | Rodgers | 700/295 |
| 2009/0206059 A1 | 8/2009 | Kiko | |
| 2009/0322159 A1 * | 12/2009 | DuBose et al. | 307/117 |

FOREIGN PATENT DOCUMENTS

| | | |
|---|---|---|
| WO | 2005089029 A1 | 9/2005 |
| WO | 2008/107214 A1 | 9/2008 |

OTHER PUBLICATIONS

New Zealand Office Action issued in connection with NZ application No. 593133, Jun. 3, 2011.

* cited by examiner

*Primary Examiner* — Jared Fureman
*Assistant Examiner* — Alfonso Perez Borroto
(74) *Attorney, Agent, or Firm* — Armstrong Teasdale LLP

(57) ABSTRACT

An electrical system includes at least one power port and at least one monitoring and control device that is coupled to the power port. The monitoring and control device includes a load control module configured to control an amount of electrical power transmitted to at least one electrical load. The load control module is further configured to receive a power control command from a power system and to transmit a power control acknowledgement to the power system.

20 Claims, 3 Drawing Sheets

SYSTEMS AND APPARATUS FOR MONITORING AND SELECTIVELY CONTROLLING A LOAD IN A POWER SYSTEM

BACKGROUND OF THE INVENTION

The present application relates generally to power generation systems and, more particularly, to systems and apparatus for use in monitoring and controlling a load in a power generation system.

During certain time periods, demand for electricity by customers may exceed available supply from power utility companies. For example, certain events may cause energy demand to peak at a level that is above a utility's ability to provide electricity to every customer. Accordingly, "blackouts" or "brownouts" may be imposed upon customers. Power utilities generally do not have the ability to selectively determine which loads within a customer's premises will be disabled during a blackout or brownout. Rather, during such power conditions, a customer's entire premises are typically subjected to a reduction or complete loss of power when the blackout or brownout occurs.

To enhance the flexibility to their customers, rather than merely forcing an indiscriminate loss of power, some power utilities use so-called "smart grid" or Advanced Metering Infrastructure (AMI) power networks. Using an AMI network, a power utility may communicate with individual loads within a customer's premises in an effort to selectively reduce power consumption during peak usage periods. For example, a power utility may reduce power to low priority loads, while maintaining power to high priority loads.

To reap the benefits of AMI networks, a power utility must be able to communicate with appliances and other loads within a customer's premises. Specifically, it is desirable and may be necessary for a utility to communicate power control messages to individual appliances, and to monitor the compliance of the appliances in responding to such control messages. The prevalence of "non-intelligent," or legacy, appliances may present an impediment to the successful implementation of an AMI network. For example, legacy appliances often do not have the capability of receiving or responding to power control messages sent by a power utility. Moreover, it may be desirable or necessary for a utility to monitor compliance with power control messages sent to loads within a customer's premises. In known AMI systems, if a message is sent to a load, the utility may be unable to verify that the load received and/or complied with the message. If a message is lost or is not implemented by the load, the utility may be unable to properly correct and/or compensate for the message failure.

BRIEF DESCRIPTION OF THE INVENTION

In one embodiment, an electrical system is provided that includes at least one power port and at least one monitoring and control device that is coupled to the power port. The monitoring and control device includes a load control module configured to control an amount of electrical power transmitted to at least one electrical load. The load control module is further configured to receive a power control command from a power system and to transmit a power control acknowledgement to the power system.

In another embodiment, a power system is provided that includes at least one electrical load, a control unit, and at least one electrical socket configured to be coupled to the control unit and to the at least one electrical load. The electrical socket includes a load control module configured to control an amount of electrical power transmitted to the at least one electrical load. The load control module is further configured to receive a power control command from the power system and to transmit a power control acknowledgement to the power system.

In yet another embodiment, a monitoring and control device is provided that includes a first load control module configured to control an amount of electrical power transmitted to a first electrical load. The load control module is also configured to receive a power control command from a power system and to transmit a power control acknowledgement to the power system.

DETAILED DESCRIPTION OF THE INVENTION

Figure 1:
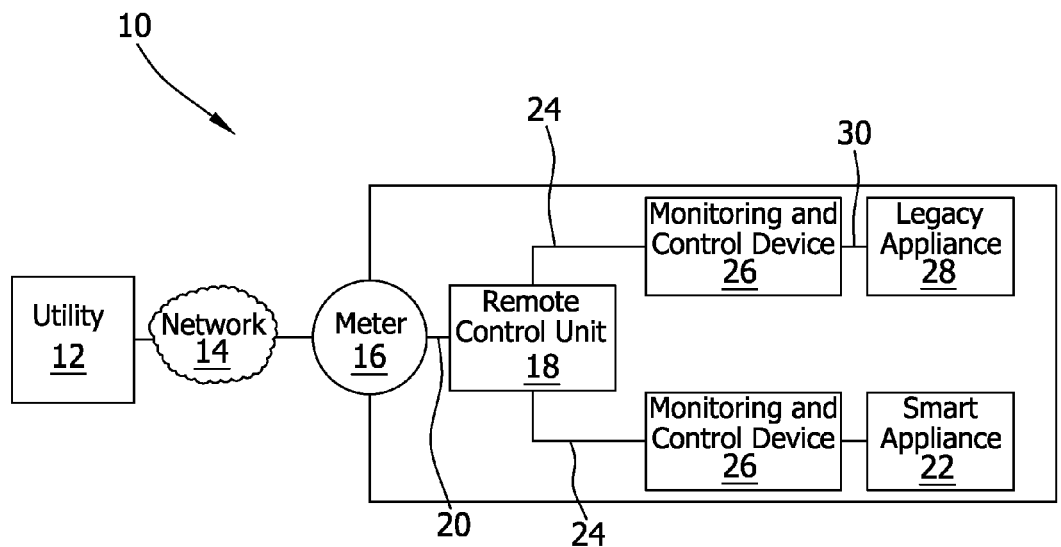
FIG. 1 is a block diagram of an exemplary power system that may be used with a user's premises.

FIG. 1 illustrates an exemplary premises power system 10. In the exemplary embodiment, system 10 includes at least one electric meter 16, a remote control unit 18, and at least one legacy appliance 28 and/or a smart appliance 22. As used herein, the term "smart appliance" refers to any appliance that includes the capability of remotely communicating with, or being remotely controlled by, another device such as a device under a utility company's control. As used herein, the term "legacy appliance" refers to an appliance that does not include the capability of remote communication or remote control.

In the exemplary embodiment, meter 16 is coupled to remote control unit 18 via a meter data link 20. Remote control unit 18 is coupled to smart appliance 22 via a remote control data link 24. Remote control data link 24 may be a wireless or wired communication connection that is also coupled to a monitoring and control device 26 via remote control data link 24. Legacy appliance 28 is coupled to monitoring and control device 26 via a power line 30. Utility 12 is coupled to power system 10 via a power network 14. More specifically, in the exemplary embodiment, utility 12 is coupled to meter 16 within power system 10 via network 14. As used herein, the term "couple" is not limited to a direct mechanical and/or electrical connection between components, but may also include an indirect mechanical and/or electrical connection between components.

To facilitate efficient operation, it is desired that utility 12 be informed of the power usage of premises power systems, such as power system 10, and that utility 12 have the capability to request premise power systems, such as power system 10, to defer a desired amount of power usage during predefined operating conditions, such as peak power operating conditions. Accordingly, in the exemplary embodiment, utility 12 transmits power control commands to power system 10. It is also desirable for utility 12 to be able to verify that any power control commands transmitted were properly received and/or implemented by each premises power system 10 coupled to utility 12. As such, in the exemplary embodiment, and as described in more detail below, utility 12 receives power control acknowledgements and power control responses from power system 10.

Network 14 is coupled to utility 12 and to power system 10. In the exemplary embodiment, network 14 is coupled to at least one meter 16 within power system 10. In an alternative embodiment, network 14 is coupled directly to remote control unit 18, and is not coupled to remote control unit 18 through meter 16. In the exemplary embodiment, network 14 conveys power control commands from utility 12 to power system 10, and conveys power control acknowledgements and power control responses from system 10 to utility 12. More specifically, in the exemplary embodiment, network 14 is an Advanced Metering Infrastructure (AMI) network.

Meter 16 is coupled to utility 12 via network 14. Meter 16 is also coupled to remote control unit 18 via meter data link 20. In the exemplary embodiment, meter 16 transmits power control commands from utility 12 to remote control unit 18, and also transmits power control acknowledgements and power control responses from remote control unit 18 to utility 12.

In the exemplary embodiment, remote control unit 18 is coupled to meter 16 via meter data link 20. Moreover, remote control unit 18 is also coupled to one or more monitoring and control devices 26 and/or to one or more smart appliances 22 via remote control data link 24. Remote control unit 18 receives power control commands from utility 12 via network 14 and meter 16, and transmits the power control commands to monitoring and control device 26 and/or to smart appliance 22. Remote control unit 18 also receives power control acknowledgements and power control responses from monitoring and control device 26 and/or smart appliance 22, and transmits the power control acknowledgements and power control responses to utility via meter 16 and network 14. In an alternative embodiment, remote control unit 18 does not communicate with utility 12 through meter 16, but rather remote control unit 18 is coupled to network 14 such that unit 18 bypasses meter 16.

In the exemplary embodiment, monitoring and control device 26 is coupled to remote control unit 18 and to legacy appliance 28. In the exemplary embodiment, monitoring and control device 26 is also coupled to smart appliance 22. Monitoring and control device 26 receives power control commands from utility 12 via network 14, meter 16, and remote control unit 18. Monitoring and control device 26 also transmits power control acknowledgements and power control responses to utility 12 via remote control unit 18, meter 16, and network 14.

Figure 2:
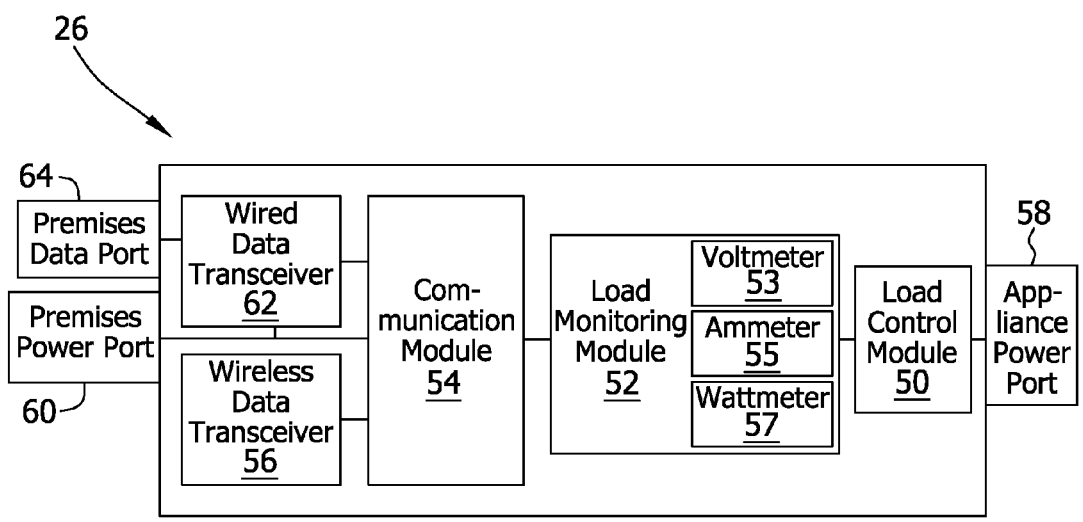
FIG. 2 is a block diagram of an exemplary monitoring and control device that may be used with the power system shown in FIG. 1.

FIG. 2 illustrates an exemplary monitoring and control device 26 that may be used with premises power system 10 (shown in FIG. 1). In the exemplary embodiment, monitoring and control device 26 includes a load control module 50, a load monitoring module 52, a communication module 54, a wireless data transceiver 56, an appliance power port 58, and a premises power port 60. Moreover, in the exemplary embodiment, monitoring and control device 26 includes a wired data transceiver 62, and a premises data port 64. Alternatively, monitoring and control device 26 does not include wireless data transceiver 56, wired data transceiver 62, and/or premises data port 64

Communication module 54 enables communication between monitoring and control device 26 and remote control unit 18. More specifically, in the exemplary embodiment, communication module 54 uses wireless data transceiver 56 to communicate with remote control unit 18. Wireless data transceiver 56 enables communication with remote control unit 18 using any of a variety of mechanisms, such as, but not limited to, Zigbee, Bluetooth, and IEEE 802.11 protocols, and/or any other wireless data transport mechanism that enables monitoring and control device 26 to function as described herein. In an alternative embodiment, communication module 54 uses wired data transceiver 62 to communicate with remote control unit 18. In such an embodiment, remote control data link 24 (shown in FIG. 1) includes a cable (not shown) coupled to premises data port 64. Wired data transceiver 62 may communicate with remote control unit 18 via remote control data link 24 using any of a variety of mechanisms, including, but not limited to, Ethernet, broadband over power lines (BPL), or any other wired data transport mechanism that enables monitoring and control device 26 to function as described herein. In another embodiment, communication module 54 communicates with remote control unit 18 via one or more electrical conduits coupled to premises power port 60 using, for example, BPL and/or any other suitable data transport mechanism. In yet another embodiment, communication module 54 is incorporated into at least one of wireless data transceiver 56, wired data transceiver 62, load monitoring module 52, and/or load control module 50. In the exemplary embodiment, communication module 54 facilitates transmitting one or more power control acknowledgements and one or more power control responses to remote control unit 18.

Load monitoring module 52 is coupled to legacy appliance 28 via appliance power port 58 and power line 30 (shown in FIG. 1). In the exemplary embodiment, load monitoring module 52 is programmed to determine a quantity of electrical power transmitted to legacy appliance 28. In the exemplary embodiment, load monitoring module 52 includes at least one of a voltmeter 53, an ammeter 55, and/or a wattmeter 57. Load monitoring module 52 determines a quantity of electrical power transmitted to legacy appliance 28 at a specific time, or during a specified elapsed period of time. Load monitoring module 52 stores values representing the determined quantity of electrical power in an internal memory unit (not shown). As such, in the exemplary embodiment, load monitoring module 52 may determine power, voltage, and current transmitted to legacy appliance 28 at a specific time, and/or may determine historical power usage of appliance 28 over a specified elapsed period of time. Load monitoring module 52 transmits one or more power control responses that may include the values representing the determined quantity of electrical power and/or the values representing the historical power usage of legacy appliance 28 to remote control unit 18. Load monitoring module uses communication module 54, wired data transceiver 62, and/or wireless data transceiver 56 to transmit the power usage value or values to remote control unit 18.

In the exemplary embodiment, load control module 50 is electrically coupled to legacy appliance 28 via appliance power port 58 and power line 30. Load control module 50 controls the electrical power transmitted to legacy appliance 28, and receives power control commands from remote control unit 18. Moreover, load control module 50 also transmits power control acknowledgements to remote control unit 18. More specifically, in the exemplary embodiment, communication module 54 receives the power control commands from remote control unit 18 and transmits the power control commands to load control module 50. Communication module 54 also transmits the power control acknowledgements from load control module 50 to remote control unit 18. In the exemplary embodiment, load control module 50 includes a power relay (not shown) that enables load control module 50 to provide a variable amount of power to legacy appliance 28. As used herein, the term "power relay" includes one or more power relays known in the art, and also includes one or more silicon controlled rectifiers, transistors, and any other circuit that provides discrete or variable output control of voltage and/or current to a load.

During operation, utility 12 transmits power control commands to meter 16 via network 14. Meter 16 transmits the power control commands to remote control unit 18 via meter data link 20. Remote control unit 18 receives the commands and transmits the commands to monitoring and control device 26 via remote control data link 24. Upon receipt of each command, monitoring and control device 26 transmits a power control acknowledgement to remote control unit 18, and remote control unit 18 transmits each acknowledgement to utility 12 via meter 16 and network 14. After the power control acknowledgement is transmitted to utility 12, monitoring and control device 26 analyzes the power control command. For example, the power control command may include a request for information about legacy appliance 28, a request for an amount of power currently being used by appliance 28, or a request for an amount of power used over a period of time. The power control command may include a command for legacy appliance 28 to reduce power consumption by a specified amount, to de-energize appliance 28, to fully energize appliance 28, to partially energize appliance 28 to a desired power level, or to resume normal operation. The above power control commands are non-exhaustive examples only, and different or additional commands may be transmitted by utility 12.

After analyzing each power control command, monitoring and control device 26 performs an action based on, or identified by, each command. If a power control command includes a request for information regarding power usage of legacy appliance 28, monitoring and control device 26 measures an amount of power transmitted to appliance 28, and/or retrieves historical power consumption data from an internal memory (not shown). More specifically, load monitoring module 52 measures the power transmitted to legacy appliance 28 using a wattmeter (not shown), or using a combination of a voltmeter and an ammeter (both not shown). Alternatively, load monitoring module 52 retrieves a value or values of historical data representing the prior power usage of legacy appliance 28. After load monitoring module 52 has retrieved the requested data based on or identified by the received power control command, load monitoring module 52 transmits the data to remote control unit 18 in the form of a power control response.

If a power control command includes a command to modify the power usage of legacy appliance 28, monitoring and control device 26 adjusts the electrical power transmitted to appliance 28 based on the command. More specifically, if utility 12 transmits a power control command for legacy appliance 28 to de-energize, load control module 50 switches off the power relay. As legacy appliance 28 is coupled to load control module 50 via power line 30, switching off the power relay, de-energizes power line 30, and thus powers off appliance 28. If utility 12 transmits a power control command for legacy appliance 28 to reduce power consumption by a specified amount, load control module 50 reduces the output voltage and/or current of the power relay, thus reducing power transmitted to appliance 28. If utility 12 transmits a power control command for legacy appliance 28 to fully energize, load control module 50 switches on power relay to full output power, thus energizing appliance 28 to full power. If utility 12 transmits a power control command for legacy appliance 28 to operate with a reduced power setting, load control module 50 switches on power relay with reduced output voltage and/or current, thus energizing appliance 28 at a desired power setting. If utility 12 transmits a power control command for legacy appliance 28 to resume normal operation, load control module 50 switches power relay to full output power, thus returning appliance 28 to full power operations.

After load control module implements the power control command, monitoring and control device 26 transmits a power control response to utility 12 via remote control unit 18, meter 16, and network 14. Specifically, monitoring and control device 26 transmits a power control response to utility 12 that includes a value representing a correct response of legacy appliance 28 to the power control command. In the exemplary embodiment, load monitoring module 52 determines an amount of power used by legacy appliance 28 after the power control command has been implemented, as described above, and includes a value representing the determined amount of power in the power control response. For example, if the power control command directs legacy appliance 28 to be turned off, and if the command is successfully implemented on appliance 28, then load monitoring module 52 may measure a power usage of approximately zero watts by appliance 28. Load monitoring module 52 transmits a power command response that includes a value representing substantially zero watts to utility 12. By comparing the power control response to an expected response value, utility 12 can verify that the power control command was successfully implemented on legacy appliance 28. In an alternative embodiment, load monitoring module 52 transmits a power control response to utility 12 that includes a value representing a successful completion of, or alternatively, a failure to implement, the power control command, rather than transmitting the determined amount of power.

In another embodiment, monitoring and control device 26 includes a baseline power usage model for legacy appliance 28. The baseline power usage model may be programmed into monitoring and control device 26, and/or monitoring and control device 26 may derive the model by monitoring the power usage of legacy appliance 28 over time. After implementing the power control command, monitoring and control device 26 compares the amount of power used by legacy appliance 28 to the baseline power usage model of appliance 28. If the amount of power used by legacy appliance 28 corresponds to a correct implementation of the power control command in view of the baseline power usage model, then monitoring and control device 26 transmits a power control response that includes a value representing a successful completion of the power control command to utility 12. For example, if utility 12 transmits a power control command for legacy appliance 28 to reduce power by 50%, monitoring and control device 26 implements the command as described above. Monitoring and control device 26 determines an amount of power supplied to legacy appliance 28, and compares that amount to the baseline power usage model to verify that power has been reduced by 50%. If power has been reduced as directed, monitoring and control device 26 transmits a power control response that includes a successful completion value and/or a value representing the reduced power usage of legacy appliance 28 back to utility 12. If power has not been reduced by the specified amount, monitoring and control device 26 transmits a power control response to utility 12 that includes a failure value and/or a value representing the current power usage of legacy appliance 28 back to utility 12.

In an alternative embodiment, utility 12 communicates with remote control unit 18 directly via network 14 rather than via meter 16. In such an embodiment, power system 10 operates with utility 12 and network 14 as described above, with the exception that communication between system 10 and utility 12 is not routed through meter 16. Rather, utility 12 transmits power control commands via network 14 to remote control unit 18. Remote control unit 18 responds to the power control commands by transmitting power control acknowledgements and power control responses to utility 12 via network 14.

In another embodiment, utility 12 communicates directly with monitoring and control device 26, rather than via meter 16 or remote control unit 18. In such embodiment, power system 10 operates with utility 12 and network 14 as described above, with the exception that communication between system 10 and utility 12 is not routed through meter 16 or remote control unit 18. Rather, utility 12 transmits power control commands via network 14 to monitoring and control device 26. Monitoring and control device 26 responds to the power control commands by transmitting power control acknowledgements and power control responses to utility 12 via network 14.

In an alternative embodiment, monitoring and control device 26 is coupled to a smart appliance 22, via remote control data link 24 or via power line 30, rather than or in addition to, a legacy appliance 28. In such embodiment, utility 12 and/or remote control unit 18 may implement more advanced power control commands using monitoring and control device 26. For example, power control commands may be implemented that include, but are not limited to including, a request to adjust a thermostat by a specified number of degrees, to delay an oven cleaning for a specified amount of time, to delay a freezer defrost cycle for a specified time, and/or to adjust a temperature of a refrigerator by a specified number of degrees. In such embodiment, monitoring and control device 26 is coupled to, and transmits power control commands to, smart appliance 22 via appliance power port 58.

Monitoring and control device 26 may transmit more advanced power control responses to utility 12 in response to the power control commands. For example, monitoring and control device 26 may transmit a power control response that includes one or more values representing the specific action undertaken by monitoring and control device 26 and/or smart appliance 22 to implement the power control command. Monitoring and control device 26 may communicate with smart appliance 22 via appliance power port 58 and power line 30, and transmits power control commands to smart appliance 22 using broadband over power lines (BPL) or another power line data transfer protocol.

In yet another embodiment, monitoring and control device 26 is coupled to a plurality of appliances, including one or more legacy appliances 28 and/or one or more smart appliances 22. In such an embodiment, monitoring and control device 26 includes a plurality of appliance power ports 58. In the exemplary embodiment, monitoring and control device 26 is configured to connect to power outlets in the United States with a standard voltage of approximately 120 VAC and at a frequency of approximately 60 Hz. In an alternative embodiment, monitoring and control device 26 is configured to connect to power outlets in other countries with a standard voltage of approximately 220-240 VAC and at a frequency of approximately 50 Hz, or any other voltage and frequency as needed.

Figure 3:
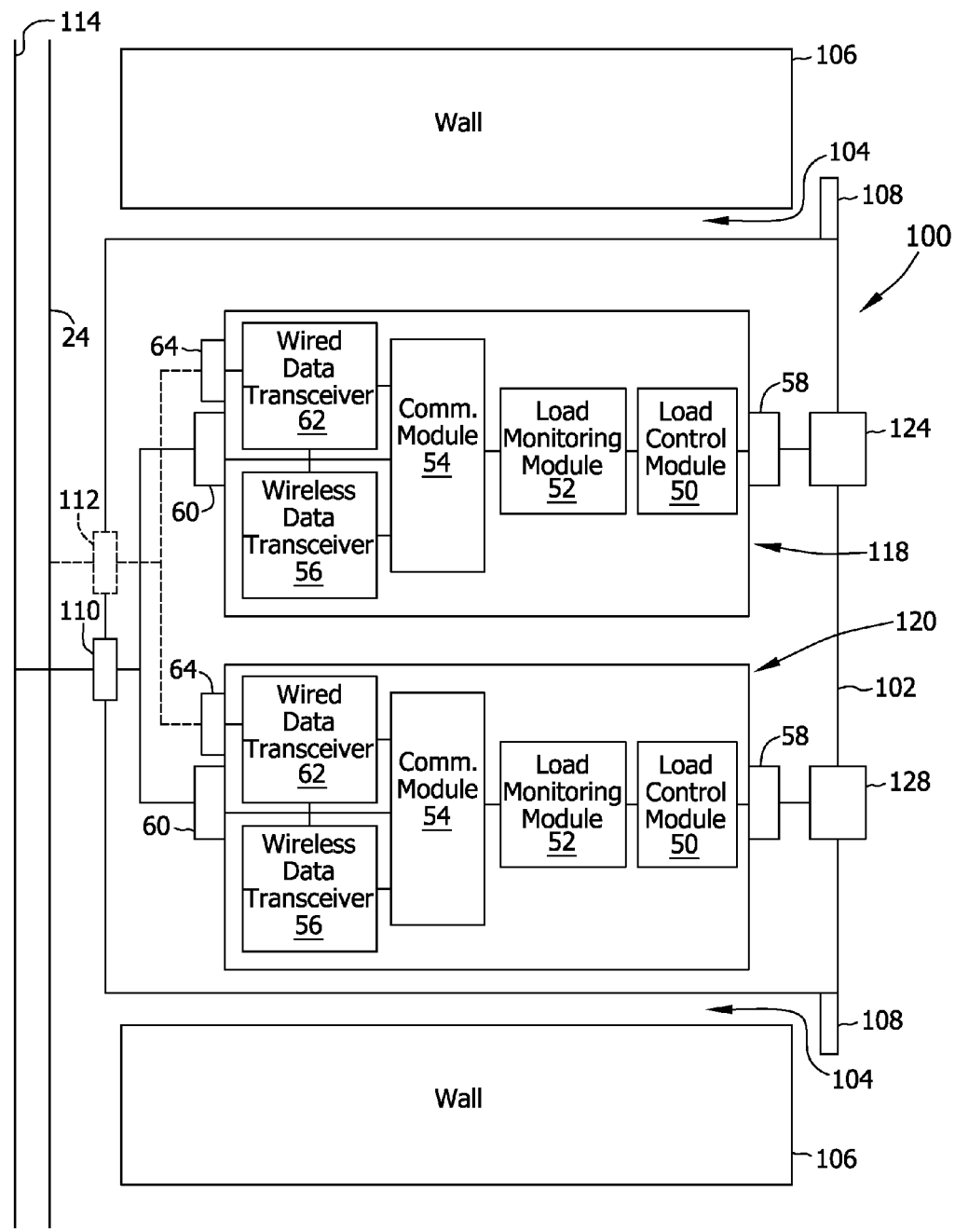
FIG. 3 is a block diagram of an exemplary electrical socket that may be used with the power system shown in FIG. 1.

FIG. 3 is a block diagram of an exemplary electrical socket 100 that may be used with premises power system 10 (shown in FIG. 1). In the exemplary embodiment, socket 100 may replace one or more monitoring and control devices 26 shown in FIG. 1 such that socket 100 is coupled to remote control unit 18, to meter 16, and/or to utility 12 via remote control data link 24, via meter data link 20, via network 14 (all shown in FIG. 1) and/or via any other data connection that enables power system 10 to function as described herein. Moreover, in the exemplary embodiment, socket 100 includes a housing 102 that is sized and shaped to fit within a cavity 104 defined in a wall 106 or another suitable structure. One or more retention mechanisms 108, such as one or more screws, bolts, flanges, and/or any other suitable mechanisms may be used to secure housing 102 to wall 106. A first opening 110 and an optional second opening 112 are defined within housing 102. Socket 100 is coupled to a premises power bus 114 through first opening 110, and socket 100 is optionally coupled to remote control data link 24 through second opening 112. Alternatively, first opening 110 and second opening 112 are combined into a single opening (not shown). In the exemplary embodiment, premises power bus 114 is coupled to remote control unit 18, to meter 16, and/or to utility 12 via remote control data link 24, via meter data link 20, via network 14, and/or via any other power connection that enables power system 10 to function as described herein. Housing 102 is constructed from a suitable material that facilitates protecting the components of electrical socket 100.

In the exemplary embodiment, socket 100 includes a first monitoring and control device 118 and a second monitoring and control device 120 that are positioned within housing 102. Unless otherwise specified, first monitoring and control device 118 and second monitoring and control device 120 are substantially similar to monitoring and control device 26 (shown in FIG. 2), and similar components are numbered with the same reference numerals. First monitoring and control device 118 and second monitoring and control device 120 receive power from premises power bus 114 through respective power ports 60, and optionally receive data from remote control data link 24 through respective premises data ports 64. Alternatively, first monitoring and control device 118 and/or second monitoring and control device 120 may receive data wirelessly from remote control data link 24 via wireless data transceivers 56 and/or may receive data from utility 12, meter 16, and/or remote control unit 18 via premises power bus 114 and power ports 60 via BPL or another power line transport protocol.

In the exemplary embodiment, appliance power port 58 of first monitoring and control device 118 is coupled to a first socket power port 124. Moreover, first socket power port 124 receives a power cable (not shown) from an appliance, such as from legacy appliance 28 or from smart appliance 22 (shown in FIG. 1). First monitoring and control device 118 transmits power to legacy appliance 28 and/or to smart appliance 22 through first socket power port 124 and/or appliance power port 58.

Moreover, in the exemplary embodiment, appliance power port 58 of second monitoring and control device 120 is coupled to a second socket power port 128. Second socket power port 128 operates similarly to first socket power port 124. As described herein, two appliances, such as legacy appliances 28 and/or smart appliances 22, may be coupled to electrical socket 100 to receive and/or transmit data and/or power to and from first monitoring and control device 118 and/or second monitoring and control device 120. Alternatively, any number of appliances may be coupled to electrical socket 100 that to enable socket 100 and/or power system 10 to function as described herein. Moreover, existing electrical sockets may be retrofitted and/or replaced by electrical socket 100 to provide an intelligent interface between, for example, a premises power system and an AMI power distribution network.

As described herein, unless otherwise specified, first monitoring and control device 118 and second monitoring and control device 120 operate substantially similarly to monitoring and control device 26 (shown in FIG. 2). As such, first monitoring and control device 118 and/or second monitoring and control device 120 receive power control commands from utility 12 (shown in FIG. 1) and implement the power control commands on legacy appliance 28 and/or smart appliance 22. First monitoring and control device 118 and/or second monitoring and control device 120 transmit power control acknowledgments and/or power control responses from legacy appliance 28 and/or smart appliance 22 to utility 12.

Figure 4:
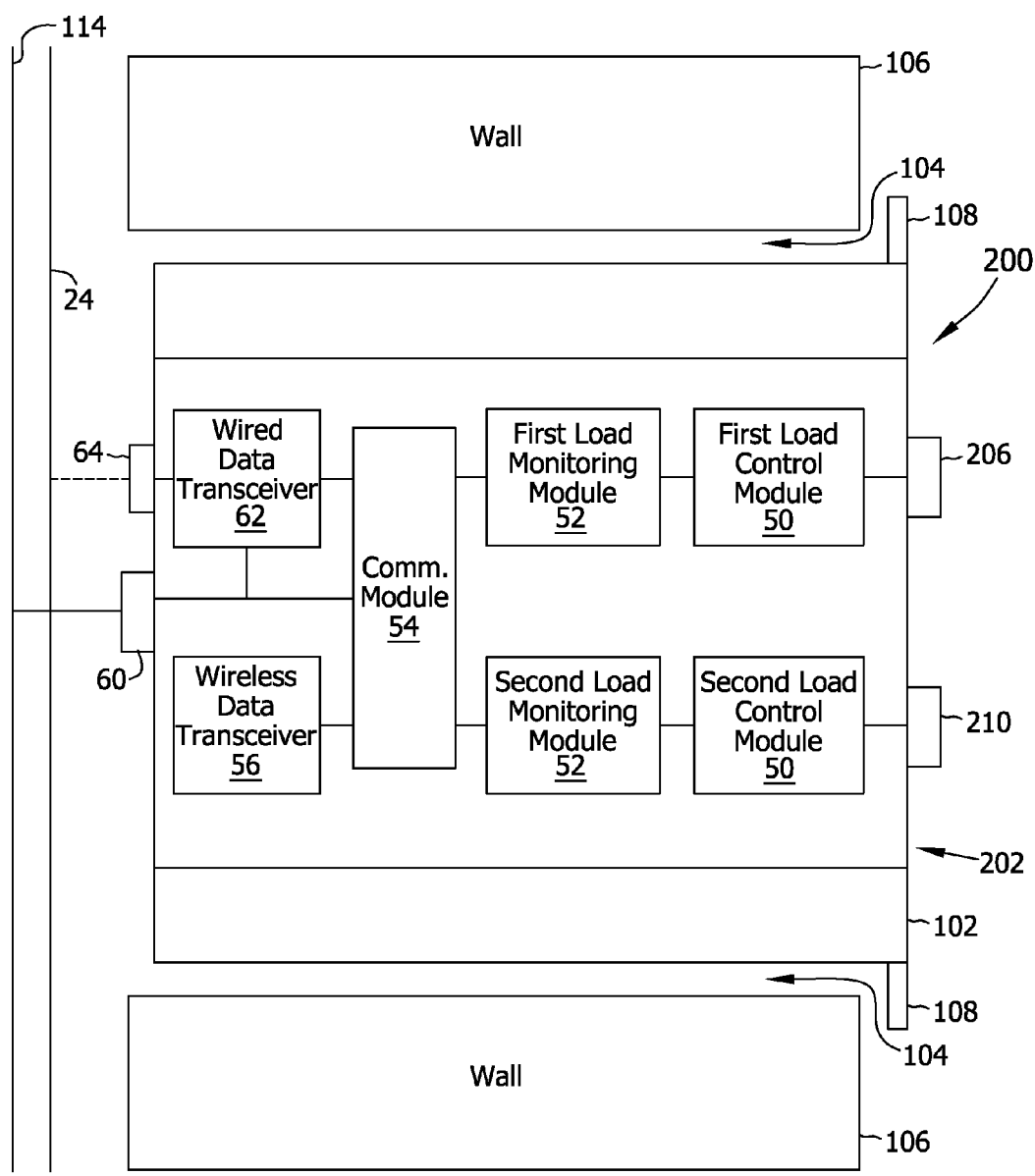
FIG. 4 is a block diagram of an alternative electrical socket that may be used with the power system shown in FIG. 1.

FIG. 4 is a block diagram of an alternative electrical socket 200 that may be used with premises power system 10 (shown in FIG. 1). Unless otherwise specified, electrical socket 200 is substantially similar to electrical socket 100 (shown in FIG. 3), and similar components are numbered with the same reference numerals. In the exemplary embodiment, socket 200 includes a monitoring and control device 202 positioned within housing 102. Monitoring and control device 202 receives power from premises power bus 114 through premises power port 60 and may receive data from remote control data link 24 through premises data port 64. Alternatively, monitoring and control device 200 may receive data wirelessly from remote control data link 24 via wireless data transceivers 56 and/or may receive data from utility 12, meter 16, and/or remote control unit 18 via premises power bus 114 and power ports 60 via BPL or another power line transport protocol.

In the exemplary embodiment, monitoring and control device 202 includes a first load control module 204 coupled to a first appliance power port 206 and a second load control module 208 coupled to a second appliance power port 210. Each of first appliance power port 206 and second appliance power port 210 is coupled to a respective appliance, such as legacy appliance 28 and/or smart appliance 22 (both shown in FIG. 1). Moreover, a first load monitoring module 212 is coupled to first load control module 204, and a second load monitoring module 214 is coupled to second load control module 208. In the exemplary embodiment, first and second load control modules 204 and 208, respectively are similar to load control module 50 (shown in FIG. 2), first and second load monitoring modules 212 and 214, respectively, are similar to load monitoring module 52 (shown in FIG. 2), and first and second appliance power ports 206 and 210, respectively, are similar to appliance power port 58 (shown in FIG. 2).

Monitoring and control device 202 includes a shared communication module 54 that is coupled to first load monitoring module 212 and to second load monitoring module 214. Moreover, in the exemplary embodiment, communication module 54 is coupled to a shared wireless data transceiver 56 and to premises power port 60. Alternatively or additionally, communication module 54 is coupled to a shared wired data transceiver 62 that is coupled to premises data port 64. In the exemplary embodiment, wired data transceiver 62, wireless data transceiver 56, and/or communication module 54 communicate with remote control unit 18 and/or to meter 16 (both shown in FIG. 1). More specifically, monitoring and control device 202 receives power control commands through wired data transceiver 62, wireless data transceiver 56, and/or communication module 54. Monitoring and control device 202 determines which appliance or appliances to transmit each power control command to, and transmits appropriate power control commands to an appliance (not shown) coupled to first appliance power port 206 using first load monitoring module 212 and/or first load control module 204. Similarly, monitoring and control device 202 transmits appropriate power control commands to an appliance (not shown) coupled to second appliance power port 210 using second load monitoring module 214, second load control module 208, and/or communication module 54. Monitoring and control device 202 transmits appropriate load control acknowledgements and load control responses from each appliance coupled to electrical socket 200 to remote control unit 18 and/or to meter 16 as described above with reference to FIG. 2. In other respects, wired data transceiver 62, wireless data transceiver 56, and communication module 54 operate as described herein with reference to FIG. 2.

A technical effect of the systems and apparatus described herein includes at least one of (a) controlling an amount of electrical power transmitted to at least one electrical load, (b) receiving a power control command from a power system, and (c) transmitting a power control acknowledgement to a power system.

The above-described systems and apparatus provide an intelligent and cost-effective electrical socket for use in monitoring and controlling a load in a power system as compared to known monitoring systems. The electrical sockets described herein enable legacy appliances to couple to an intelligent power grid and enable smart appliances to more fully integrate into an intelligent power grid. The sockets receive and respond to power control messages sent from a power utility company. Moreover, the sockets implement the power control messages on legacy and smart appliances, and monitor the legacy and smart appliances' responses to the power control commands. As such, the above-described sockets facilitate more efficient premises load control by power utility companies than existing sockets, and enable utilities to control individual appliances within a customer's premises. As a result, utilities may use the above-described sockets rather than existing sockets to facilitate reducing power consumption by non-critical loads within a customer's premises, maintaining power to critical loads, and more efficiently managing a power grid. Moreover, by installing the above-described sockets in place of existing sockets, customers may also reduce power consumption by loads within their premises, and reduce their power bills.

Exemplary embodiments of systems and apparatus for monitoring and controlling a load in a power system are described above in detail. The systems and apparatus are not limited to the specific embodiments described herein, but rather, components of the systems and/or apparatus may be utilized independently and separately from other components described herein. For example, the electrical sockets may also be used in combination with other power systems, and are not limited to practice with only the power system as described herein. Rather, the above-described embodiments can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical system, comprising:
    at least one power port; and
    an electrical socket coupled to the at least one power port, wherein the electrical socket includes a housing, at least one opening oriented to receive at least one power cord from at least one electrical load, and at least one monitoring and control device positioned within said housing, said at least one monitoring and control device comprising:
        a load control module configured to control an amount of electrical power transmitted to the at least one electrical load, said load control module further configured to:
            receive a power control command from a power system;
            transmit a power control acknowledgement to the power system; and
            implement the power control command after transmitting the power control acknowledgment.

2. An electrical system in accordance with claim 1, wherein said at least one monitoring and control device further comprises a communication module configured to be communicatively coupled to the power system.

3. An electrical system in accordance with claim 2, further comprising a wireless data transceiver, wherein said communication module communicates with the power system through said wireless data transceiver.

4. An electrical system in accordance with claim 2, further comprising a wired data transceiver, wherein said communication module communicates with the power system through said wired data transceiver.

5. An electrical system in accordance with claim 1, wherein said at least one monitoring and control device further comprises at least one of a voltmeter, an ammeter, and a wattmeter configured to be coupled to the at least one electrical load.

6. An electrical system in accordance with claim 1, wherein said load control module provides a variable voltage and a variable current to the at least one electrical load.

7. An electrical system in accordance with claim 1, wherein said electrical socket receives at least one power cord from at least one legacy appliance, and wherein said load control module is configured to control an electrical load delivered to said at least one legacy appliance.

8. An electrical system in accordance with claim 1, further comprising a load monitoring module configured to:
    determine an amount of electrical power transmitted to the at least one electrical load; and
    transmit a value representing the determined amount of electrical power to the power system.

9. An electrical system in accordance with claim 1, wherein said load control module further is configured to implement the power control command on the at least one electrical load.

10. A power system, comprising:
    at least one electrical load;
    a control unit; and
    at least one electrical socket configured to be coupled to said control unit and to said at least one electrical load, said at least one electrical socket comprising:
        a housing:
            at least one opening oriented to receive at least one Dower cord from electrical load; and
            a load control module positioned within said housing, and configured to control an amount of electrical power transmitted to said at least one electrical load, said load control module further configured to:
                receive a power control command from said power system;
                transmit a power control acknowledgement to said power system; and
                implement the power control command after transmitting the power control acknowledgment.

11. A power system in accordance with claim 10, wherein said at least one electrical socket further comprises a communication module configured to be communicatively coupled to said control unit.

12. A power system in accordance with claim 11, further comprising a wireless data transceiver, wherein said communication module communicates with said control unit through said wireless data transceiver.

13. A power system in accordance with claim 11, further comprising a wired data transceiver, wherein said communication module communicates with said control unit through said wired data transceiver.

14. A power system in accordance with claim 10, wherein said at least one electrical socket comprises at least one of a voltmeter, an ammeter, and a wattmeter configured to be coupled to said at least one electrical load.

15. A power system in accordance with claim 10, wherein said load control module transmits a variable voltage and a variable current to said at least one electrical load.

16. A power system n accordance with claim 10, wherein said electrical socket receives at least one power cord from at least one legacy appliance, and wherein said load control module is configured to control an electrical load delivered to said at least one legacy appliance.

17. A power system in accordance with claim 10, wherein said at least one electrical socket further comprises a load monitoring module configured to:
    determine an amount of electrical power transmitted to said at least one electrical load; and
    transmit a value representing the determined amount of electrical power to said power system.

18. An electrical socket, comprising:
    a housing;
    at least one opening oriented to receive at least one power cord from a first electrical load; and
    a first load control module positioned within said housing, and configured to control an amount of electrical power transmitted to said first electrical load, said load control module further configured to:
        receive a power control command from a power system;
        transmit a power control acknowledgement to the power system; and
        implement the power control command after transmitting the power control acknowledgment.

19. An electrical socket in accordance with claim 18, further comprising a second load control module positioned within said housing, and configured to control an amount of electrical power transmitted to a second electrical load.

20. An electrical socket in accordance with claim 18, further comprising a load monitoring module configured to determine an amount of electrical power transmitted to the first electrical load.

* * * * *